United States Patent
O'Riordan et al.

(10) Patent No.: US 10,133,653 B2
(45) Date of Patent: Nov. 20, 2018

(54) RECORDING AND PLAYBACK OF TRACE AND VIDEO LOG DATA FOR PROGRAMS

(75) Inventors: Donald J. O'Riordan, Sunnyvale, CA (US); David Varghese, Kerala (IN)

(73) Assignee: Cadence Design Systems, Inc., San Jose, CA (US)

( * ) Notice: Subject to any disclaimer, the term of this patent is extended or adjusted under 35 U.S.C. 154(b) by 1436 days.

(21) Appl. No.: 13/403,847

(22) Filed: Feb. 23, 2012

(65) Prior Publication Data
US 2013/0227350 A1    Aug. 29, 2013

(51) Int. Cl.
*G06F 9/44*    (2018.01)
*G06F 11/36*   (2006.01)
*G06F 11/34*   (2006.01)

(52) U.S. Cl.
CPC ...... *G06F 11/3636* (2013.01); *G06F 11/3476* (2013.01); *G06F 2201/865* (2013.01)

(58) Field of Classification Search
CPC .......................................................... G06F 9/44
USPC .................................................. 717/124–132
See application file for complete search history.

(56) References Cited

U.S. PATENT DOCUMENTS

| | | | | |
|---|---|---|---|---|
| 5,404,474 A * | 4/1995 | Crook et al. | ................... | 711/212 |
| 5,835,084 A * | 11/1998 | Bailey | ................... | G06Q 10/107 |
| | | | | 715/783 |
| 7,478,279 B2 | 1/2009 | Shankar et al. | | |
| 7,533,371 B1 * | 5/2009 | Johns et al. | ................... | 717/130 |
| 7,653,896 B2 * | 1/2010 | Herdeg, III | ......... | G06F 9/45512 |
| | | | | 715/704 |
| 7,721,264 B2 * | 5/2010 | Peterson et al. | .............. | 717/125 |
| 8,060,795 B2 | 11/2011 | Bakekolo et al. | | |
| 2003/0061541 A1 * | 3/2003 | Kaler | .................... | G06F 11/302 |
| | | | | 714/37 |
| 2004/0064762 A1 * | 4/2004 | Deshpande et al. | ............ | 714/44 |
| 2006/0050929 A1 * | 3/2006 | Rast et al. | ..................... | 382/103 |
| 2007/0188810 A1 * | 8/2007 | Nakagama | ......... | H04N 1/00037 |
| | | | | 358/2.1 |
| 2007/0285714 A1 * | 12/2007 | Hirayama | .............. | G06Q 30/02 |
| | | | | 358/1.15 |
| 2008/0010466 A1 * | 1/2008 | Hopper | ......................... | 713/187 |
| 2008/0294985 A1 * | 11/2008 | Milov | ................. | G06F 11/3664 |
| | | | | 715/704 |
| 2010/0088683 A1 | 4/2010 | Golender et al. | | |
| 2010/0198876 A1 * | 8/2010 | Estok | ............................ | 707/793 |
| 2011/0069229 A1 * | 3/2011 | Lord | ........................ | H04N 5/77 |
| | | | | 348/461 |
| 2015/0341401 A1 * | 11/2015 | Lee | ........................ | H04L 65/403 |
| | | | | 715/753 |

FOREIGN PATENT DOCUMENTS

| | | |
|---|---|---|
| CN | 102073581 | 5/2011 |
| TW | 201129903 | 9/2011 |

* cited by examiner

*Primary Examiner* — Jae U Jeon
(74) *Attorney, Agent, or Firm* — Vista IP Law Group, LLP

(57) ABSTRACT

Recording and playback of trace log data and video log data for programs is described. In one aspect, a method for viewing log data recorded during execution of a program includes causing a display of recorded images depicting prior visual user interaction with the program during a particular time period. The method also includes causing a display of messages tracing and describing prior execution of the program during the particular time period. The display of the messages and the display of the recorded images are synchronized.

18 Claims, 7 Drawing Sheets

RECORDING AND PLAYBACK OF TRACE AND VIDEO LOG DATA FOR PROGRAMS

FIELD OF THE INVENTION

The present inventions relate to software for computer systems, and more particularly to diagnosing errors in computer program execution.

BACKGROUND OF THE INVENTION

Software has continually increased in complexity and sophistication. Many software applications have grown to include greater amounts of functions and abilities. For example, one common application is electronic design automation (EDA), in which sophisticated design software is used to create increasingly more complex designs such as electronic component designs. The design software allows creation, viewing, and editing, and output of graphical designs and includes simulation functions. Other graphical editors allow creation of designs of many different types.

With more complex functionality, software programs can often be more prone to errors and crashes. For example, software programs such as graphical editors are prone to bugs and crash issues, and are often used in environments in which a crash may not be easily reproducible. Even if a crash is reproducible, the gathering of a reproducible testcase to facilitate debugging the software is often prohibitive due to the amount and complexity of the data to be gathered, and/or security and sensitivity issues (e.g., customers working on critical designs often do not wish to share all the technical details of their design with the software vendor).

Thus software developers have a need for sophisticated debugging tools. One common debugging tool includes tracing and logging, in which internal steps or events of execution of a program are determined using a stack trace or other tracing function, and the steps or events are stored as entries or messages in a logfile. In case of a bug or crash in the program occurring, the logfile entries can later be reviewed by a reviewer to determine the execution operations of the program leading up to the bug or crash to help diagnose the problem. However, logfiles have several limitations. While many customers or other users are willing to share these logs with a software vendor or other reviewer, it is often the case that the log contains insufficient information for a reviewer to be able to understand or reproduce the issue in order to debug it. The log can contain a trace of the low level actions performed by an interacting user of the program prior to the software crashing, but it includes no context information describing the user's input or actions leading up to the crash. It is often difficult for the reviewer to gain an understanding of what the user was trying to do, or on what type of data the user was trying to operate a particular software feature. In addition, the log typically includes a very large numbers of entries describing many different actions, which can be time consuming to review. These disadvantages limit the diagnostic capability of the logfile.

SUMMARY OF THE INVENTION

Recording and playback of trace log data and video log data for programs is described. In one aspect, a method for viewing log data recorded during execution of a program includes causing a display of recorded images depicting prior visual user interaction with the program during a particular time period. The method also includes causing a display of messages tracing and describing prior execution of the program during the particular time period. The display of the messages and the display of the recorded images are synchronized.

In another aspect, a system for viewing log data recorded during execution of a program includes at least one storage device storing a plurality of recorded images depicting prior visual user interaction with the program during a particular time period. At least one processor are operative to perform operations including causing a display of the recorded images, causing a display of messages tracing and describing prior execution of the program during the particular time period, and causing synchronization of the display of the messages with the display of the recorded images.

In another aspect, a method for recording log data during execution of a program on a computer system includes capturing images depicting continuing visual user interaction with the program as displayed on a display device during execution of the program. A subset of the captured images are stored on a storage device, the subset being a predetermined number of the captured images. A newly-captured image is stored in place of an oldest stored captured image to maintain the predetermined number of the captured images.

Embodiments disclosed herein allow enhanced diagnosis of bugs, crashes, and other errors in software operation, thus reducing time and effort in the debugging of software.

DETAILED DESCRIPTION

Figure 1:
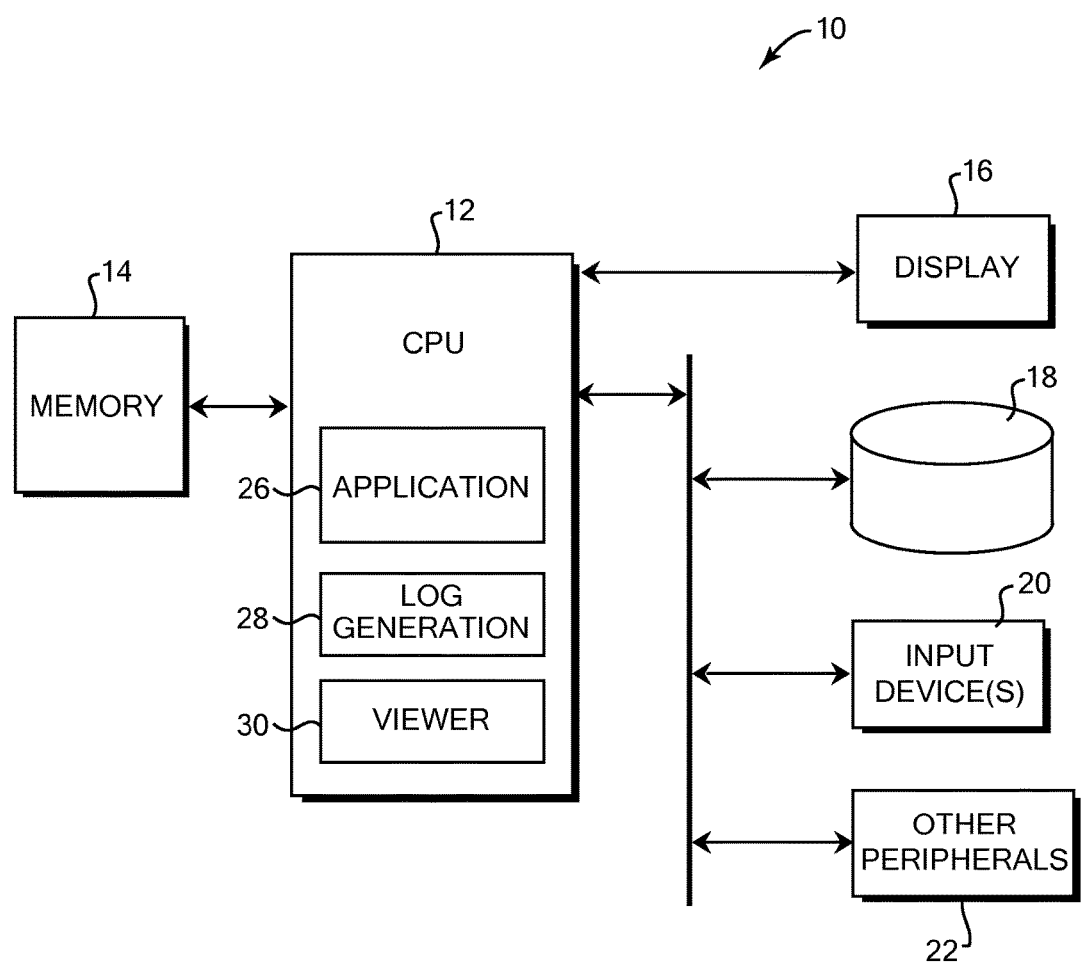
FIG. 1 is a is a block diagram illustrating a system suitable for use with one or more embodiments disclosed herein.

Embodiments described herein relate to software for computer systems, and more particularly to diagnosing errors in computer program execution. Various modifications to the described embodiments and the generic principles and features described herein will be readily apparent to those skilled in the art. Thus, the embodiments herein are not intended to be limited to the examples shown but is to be accorded the widest scope consistent with the principles and features described herein.

These embodiments are mainly described in terms of particular methods and systems provided in particular implementations. However, one of ordinary skill in the art will readily recognize that these methods and systems will operate effectively in other implementations. For example, system implementations usable with the present embodiments can take a number of different forms. The present embodiments will also be described in the context of particular methods having certain steps. However, the methods and systems operate effectively for other methods having different and/or additional steps not inconsistent with these embodiments.

The embodiments described herein can take the form of software embodiments, hardware embodiments, or an embodiments containing both hardware and software elements. A software embodiment can include but is not limited to firmware, resident software, microcode, etc. run by a processor or processing circuit. A hardware embodiment can utilize logic gates, processors, electronic components, and other hardware elements. Furthermore, the some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), flash memory, a rigid magnetic disk, an optical disk, and a solid-state memory drive. Current examples of optical disks include compact disk read only memory (CD-ROM), compact disk read/write (CD-R/W), DVD, and Blu-ray.

Embodiments herein can enable enhanced diagnosis of errors in the execution of a software program. Features allow capturing and storing visual information output during program execution by recording the visual display of the running program and/or operating system graphical desktop, such as images of the interacting user's desktop or software visual state. This recording of a video including image log data is performed in conjunction with an execution trace generating and/or storing entries in a trace logfile which describes execution of the program during the same time period of the image recording. Features also allow presentation of the log data to a reviewing user, where a synchronization scheme can be employed to render a playback of the image log data as a video in synchronization with the display of the logfile entries produced by the running program, e.g., in text form. This allows a reviewing user to determine a visual context occurring during traced program execution, by viewing images and objects displayed by the running program and/or system at each moment that the software program was executing the recorded steps in the trace logfile, and allowing linking of visual events during execution to events in the trace logfile.

In some embodiments, a ring buffer scheme can be employed to store the image log data, limiting the amount of image data to a predetermined number of images and/or a predetermined duration of the software program execution at a particular playback rate (e.g., frames per second). The stored image data is thus limited to the final, and typically most pertinent, timespan of execution of the software program process being recorded, thereby conserving system resources.

The image log data provides video insight into the history of the interacting user's experience shortly before the software program terminated, such as due to a program crash. The combination of the recorded image log data and the trace logfile data provides a rich set of information for the reviewing user to attempt to debug a crash issue or other problem experienced by the interacting user and/or program(s), even in the complete absence of a reproducible test case (which often occurs in practice). This addresses the often insufficient information provided by traditional trace logfiles for error diagnosis. In some embodiments, the use of standard desktop video recording tools is not required for the recording of the image log data.

Various users can use the recording and/or reviewing system(s) which can provide numerous features as described below. Herein, an "interacting user" is a user who uses a subject program in its normal use and whose interactions are being recorded according to features described herein, and a "reviewing user" is a user who views generated log data describing the use of the subject program by the interacting user. These users can in various embodiments be a single person, or separate individuals. In some embodiments, such "users" can include persons as well as other programs that interface with the system.

The term "log data" or "log" is used herein to refer to both log data provided from tracing internal execution steps or events of a program (such as stored in a trace logfile, e.g., function calls) ("trace log data") as well as images of visual program and operating system output that were recorded during program execution ("image log data" or "video log data"). The trace log data can also be referred to herein as "messages," "entries," or "message entries" since such data is typically provided as messages that are entries in the trace logfile. The messages are typically displayed as text messages (including text-like symbols) when presented to the user. In other embodiments, the trace log data can be presented in a non-text form, such as using audio, etc.

To more particularly describe the features of the described embodiments, please refer to FIGS. 1-6 in conjunction with the discussion below.

FIG. 1 is a block diagram illustrating a system 10 suitable for use with one or more embodiments disclosed herein. System 10 can be any suitable computer system, server, or other electronic or hardware device. For example, the system 10 can be implemented in a mainframe computer or server, desktop computer, workstation, portable computer, or electronic device (set-top box, portable device, cell phone, personal digital assistant, media player, game device, etc.). System 10 includes a CPU 12, memory 14, display device 16, storage device 18, input device(s) 20, and other peripherals 22.

CPU 12 can be one or more processors or processing circuits to execute program code and control basic operations of the system 10, including processing operations, manipulating data, issuing commands to other components of the system 10, etc. For example, an operating system can run on the system 10 and is implemented by the CPU 12 and other components of the system 10. CPU 12 can also implement graphical design software 26 and other software, as described further below.

Memory 14 is typically provided in system 10 for access by the CPU 12, and can include one or more of a variety of types, such as random access memory (RAM), read-only memory (ROM), Electrical Erasable Read-only Memory (EEPROM), Flash memory, etc.

Display device 16 outputs displayed images to a user of the system 10. Display device 16 can be any of a variety of types of displays, including LCD, Plasma, CRT, etc. Some implementations of the display device 16 include a screen having a screen size, e.g., an area within which images are displayed. In some embodiments, the CPU 12, and/or a different processor in communication with the display device, can cause the display of images on the display device by providing the appropriate signals to well-known components of system 10 used in displaying images on device 16.

Storage device 18 can store data that may be retrieved by the CPU such as program instructions and/or data, including some or all of the log data recorded and/or played back as described herein. One or more storage devices 18 can be provided in system 10 and/or provided in other systems and in communication with system 10, such as over a network or other communication link. Storage device 18 can be any of a variety of devices used to store data electronically, such as hard disk, hard disk arrays, solid-state memory (Flash, RAM, ROM, etc.), CD-ROM, DVD-ROM, Blu-Ray disc, magnetic tape, etc. Memory 14 can also be considered a storage device 18.

Storage such as storage device 18 can also implement a ring buffer for use with some embodiments of log data recording described herein. The ring buffer can allocate a fixed amount of storage or storage locations to store log data such as image log data (frames), and in some embodiments can also store data associated with each frame, such as cursor coordinates and corresponding trace logfile position. After the ring buffer fills to capacity, a new or additional frame is stored over the oldest frame in the ring buffer, allowing a constrained or limited amount of storage to be used. In some embodiments, the ring buffer can be implemented in a larger-capacity storage device 18 such as a magnetic or optical disk or flash memory, which can provide greater amounts of storage than memory 14 for video frames and/or can avoid occupying system memory 14 which may be used by the running program (such as application 26). Various embodiments can store all the image frames and associated information on a larger-capacity storage device 18, or store all the image and associated information in memory 14. Or, image data can be stored in a ring buffer on a larger-capacity storage device 18 such as a disk, and associated data can be stored in another ring buffer in memory 14.

Input devices 20 can include any of a variety of devices that allow users to input commands and data to the system 10, including a keyboard, mouse, trackball, stylus, touchscreen, microphone/voice recognition device, motion sensors, other electronic device (such as another computer system or portable electronic device), or other input device. Other peripherals 22 can include any other devices connected to and used by the system 10, such as any peripheral, card, or interface device that performs one or more functions and communicates with the system 10, such as network adapters that enable the system 10 to become coupled to other computer systems or devices through intervening private or public networks, scanners, sensors, output devices (e.g., printers, sound speakers), etc. In the example of FIG. 1, the display device 16 is connected to the CPU 12 by its own dedicated bus, while storage device 18, input devices 20, and other peripherals 22 can be connected to a common bus that is also connected to the CPU. In other embodiments, the display device 16 and other devices can each have their own bus, or share one or more common buses. One or more of the buses or other links can be implemented using wires or wirelessly, according to any of well-known standards and protocols.

An application 26 can be implemented at least in part by the CPU 12 (and/or other processor(s) of system 10), e.g., as directed by program code stored on the memory 14 and/or storage device 18. For example, the application 26 can be the subject program that is being traced and logged according to features described herein. The application 26 can be any program executed by the system 10 and typically providing a visual interface with which a user can interact. For example, the application 26 can cause the display of an interface and visual output on the display device 16 and receive input from one or more of the input devices 20 to control the functions of the application and interface. In an example embodiment, the application 26 can be a graphical editing application and interface to allow the creation and editing of designs or images. In some embodiments, for example, a graphical design application 26 can allow designers to create and edit designs (such as graphical schematics and layout designs) for integrated circuit schematics, circuit boards, or other electronic designs used to guide manufacture of integrated circuits. Other graphical editing applications can allow a user to create or edit other types of designs, images, documents, or other data.

Log generation block 28 can be implemented at least in part by the CPU 12 and/or other processors of system 10, based on program code read from a storage device. The functionality of block 28 can be provided as part of the application 26 (or another subject program being logged), or can be provided as part of a different application, operating system, or other program that can be separate from the application 26. Log generation block 28 can generate log data based on the execution of the application 26 and based on user interaction with the application. In some embodiments, the generated log data includes a trace logfile tracing execution of application 26, and image log data depicting the visual interaction of an interacting user with application 26. For example, the trace log data can be generated using functions of the application 26, and the image log data can be generated using a process or thread of the application. Other embodiments can use different configurations, and can split the trace log data and image log data generation in different programs. In some embodiments, the log generation block 28 can include one or more standardized components, such as a trace logfile generation program, display capture program to capture and generate image data, etc.

The viewer block 30 can be implemented at least in part by the CPU 12 to allow a reviewing user to select a particular stored log of program execution and display or replay the stored log, including trace log data and image log data, as described in greater detail below. In some embodiments, the viewer block 30 can be a separate program, such as a standard viewing application, e.g., a web browser or a document viewer. In other embodiments, the viewer functionality can be included in the application 26 or other subject program being logged.

For example, in some embodiments system 10 is used to generate log data based on an interacting user using the application 26 and system 10, and the viewer 30 and same system 10 is used by a reviewing user to review stored log data. In other embodiments, a first system 10 can be used by an interacting user to interact with an application 26 such that a local log generation block 28 generates and stores log data, and a second system 10 can access the stored log data (e.g., over a network) such that a reviewing user can display the log data on the second system using a local viewer 30.

Figure 2A:
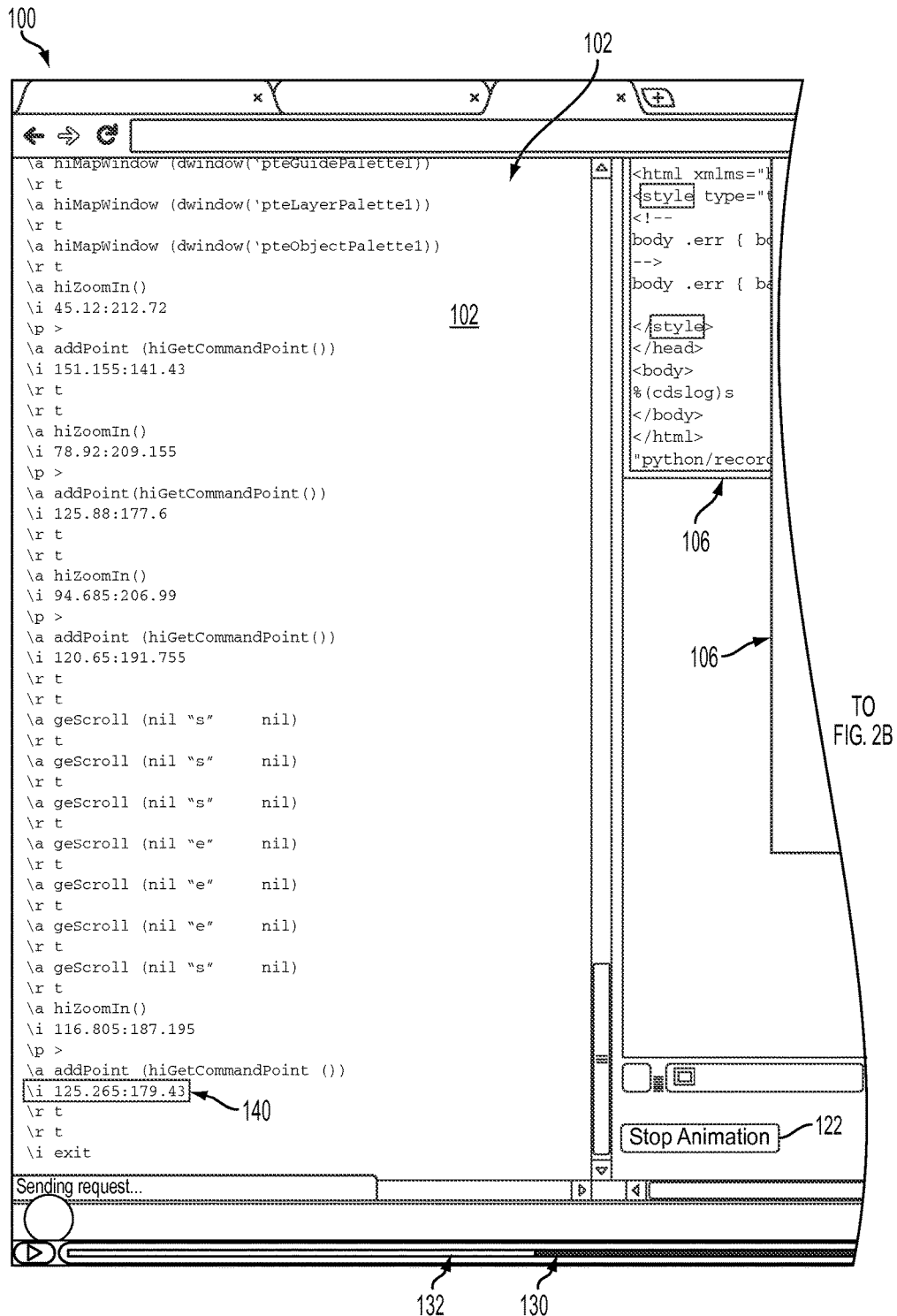
FIGS. 2A and 2B are diagrammatic illustrations of one example embodiment of a graphical interface which can be used for viewing log data according to embodiments described herein.
Figure 2B:
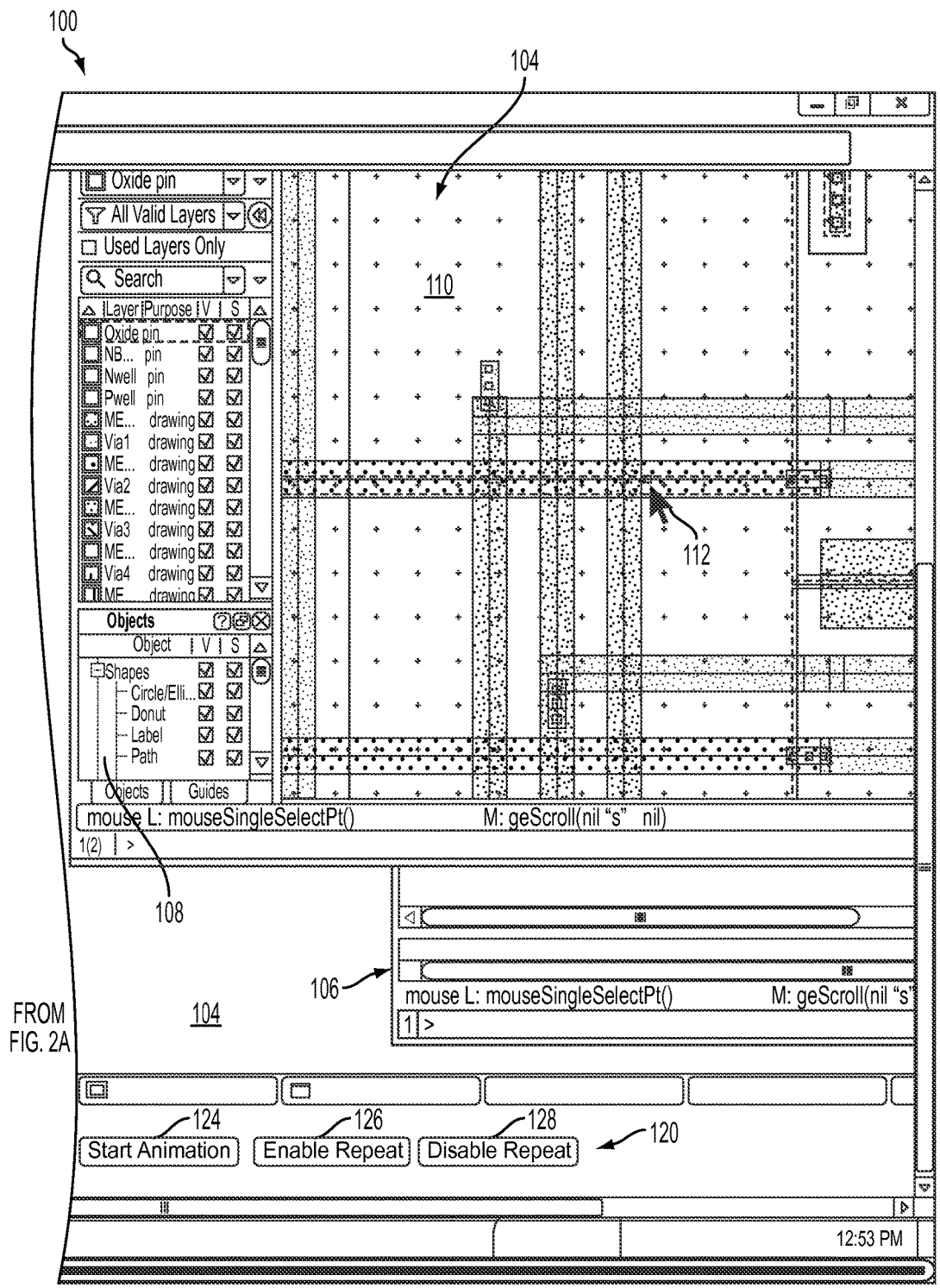

FIGS. 2A and 2B are a diagrammatic illustration of one example embodiment of a graphical interface 100 which can be displayed by a display device 16 in system 10 and can be used for viewing log data according to embodiments described herein. Interface 100 can be displayed on a display screen to allow a reviewing user, for example, to select displayed options in the interface 100. In the example of FIGS. 2A-2B, a reviewing user has selected a stored log of program execution for a subject program and has commanded the log to be displayed/replayed in interface 100. For example, the interface 100 can be displayed by a viewer block 30 that has access to the stored log data generated during subject program execution. In one example, the interface 100 can be displayed by a web browser or other viewer program, for example. The interface 100 is shown as one or more displayed windows within a graphical user interface, but can be displayed in other forms in other interfaces. Various controls can be displayed such as menu items and buttons which allow the user to select various viewing and editing functions of the application and interface 100.

The displayed interface 100 includes a trace log view 102 which can be displayed in a window or other particular area of the display. The trace log view 102 displays trace log data of the stored log that has been selected by the reviewing user to be displayed and/or replayed. In some embodiments the trace logfile can be a standard file of log data produced by application 26 or a utility program, and view 102 displays a text rendition of the logfile messages. In this example, the trace log view 102 displays multiple steps or events of previous execution of the subject program, each step on a different text line. The display of the trace log view 102 can be scrolled based on reviewing user input (e.g., using scroll bars or other controls), and/or based on the display of the image log view 104 as described below.

In some embodiments, each message in view 102 can indicate a program execution step or event that occurred, and the specific nature of that event. For instance, in the example shown in FIGS. 2A-2B, messages prefixed with "\a" can indicate interacting user entries, and can describe commands invoked due to menu selections or other user selections in an interface of the subject program (such as application 26). Similarly, "\i" text lines can describe additional interacting user input such as coordinates of a user-controlled cursor (e.g., mouse pointer) in a window when a click was performed, e.g. a click of a mouse button in a graphical design window. In the example, "\r" text lines can indicate system responses, such as a "t" character representing a "true" state of a status flag and "nil" indicating a "false" state. Furthermore, "\p" text lines can indicate system-generated responses to the user. Other prefixes or text signifiers can also be used to indicate system-generated prompts, output or informational messages, warnings, errors, diagnostics (memory usage, etc.).

The commands invoked in some of the messages in the trace log view 102 of this example can describe any of a variety of steps taken during execution by the subject program. For example, in the example of FIGS. 2A-2B, the "hiZoomIn( )" command can indicate that the interacting user invoked a zoom command to cause a graphical view window of the subject program to change to a closer view of a displayed image or design. Coordinates that follow this command can indicate a corner of a user-drawn bounding box establishing the dimensions and location of the zoom command. The system prompt following the coordinates prompts the interacting user to input the coordinates for the diagonally-opposite corner of the bounding box, and the coordinates following the prompt indicate the interacting user's input coordinates for that corner. The first system response of "t" (true) following the coordinates indicate the system responding to the second set of coordinates (indicating that the full set of coordinates for the bounding box are now received), and the second "t" responds to the user's command invocation of the zoom (indicating that the zoom command is complete and initiated). Other commands and responses can be similarly indicated, such as panning or other view-editing commands, drawing or other creation commands, user cancellation of commands, etc. Other embodiments can trace program execution using different formats and commands.

Interface 100 also includes an image log view 104 which displays image log data in a visual form for the reviewing user. The image log view 104 can display images that were captured during the interacting user's interaction with the subject program, and rendered for display. In this example, the image log view 104 displays an image of a graphical user interface or desktop displaying multiple windows 106 visible during the interacting user's interaction with the subject program. Thus the image in view 104 captures the output of the interacting user's display screen during a previous time when the interacting user was using the subject program, on a system running the subject program. In this example, the subject program is an application 26, and is a graphical editing application providing a main window 108 that allows an interacting user to create and/or edit a graphical layout design for integrated circuits. A main view 110 in the main window 108 of the subject program displays a graphical layout or portion thereof, including design objects and/or other components or features of the design. A cursor 112 (such as a mouse pointer) is shown which was controlled by the interacting user during interaction with the graphical editing program, such as selecting objects or areas in the main view 110, selecting commands in other displayed menus or lists, etc. In other embodiments, only one or more windows provided by the subject program are captured as image log data and displayed in image log view 104. In other embodiments in which the subject program is a graphical editing application, images from other types of graphical editing applications can be displayed, such as images of line drawings, graphical shapes, photo images or videos, maps, or other images. In other embodiments, other types of subject programs can provide the image log data, such as office applications (word processor, spreadsheet, etc.), games, utilities, web-based applications, simulations, or other type of application.

In some embodiments, one or more sequential images (e.g., frames) can be displayed in image log view 104 to depict the interacting user's interaction with the subject program. The sequential images can form a video animation showing the actions of the interacting user as experienced by the interacting user on a display screen at the time of the interaction. The video images can be displayed according to a frame rate selected by the reviewing user, for example.

In other embodiments, a single static image can be displayed in image log view 104, or a series of images slowly displayed in sequence as in a slide show.

The interface 100 can also include image playback controls 120 selectable by a reviewing user, which in this example are displayed within the image log view 104, e.g., under and/or above the images displayed in that view. In the shown example, these controls can include a stop animation button 122, a start animation button 124, an enable repeat button 126, and a disable repeat button 128. The start animation button 124 causes a video or sequence of images to be played in the image log view 104 depicting the actions of the interacting user with the subject program over time, according to a predetermined and/or user-settable frame rate. In some embodiments, a horizontal bar display 130 or other display can indicate the current playback location by a progress bar 132 with reference to the entire length of the video that is represented by the width of the bar display, and allowing a reviewing user to select any location within the bar display to start playback at the selected location. The stop animation button 122 causes any playing animation to stop. Enable and disable repeat buttons 126 and 128 allow a reviewing user to select whether the image playback will automatically restart at the beginning of the video after the end of the video is played. Other standard video playback controls can also be provided, such as fast forward, rewind, next track or next video (e.g., if multiple image logs are accessible), etc.

According to some features of embodiments described herein, the displays in the trace log view 102 and in the image log view 104 are synchronized in their playback. Thus, one or more messages of the trace logfile data displayed in view 102 correspond with the images currently being displayed in the image log view 104. In some embodiments, one or more visual indicators can be displayed in the trace log view 102 to show which particular text message (program execution step or event) corresponds with the image currently being displayed in view 104. For example, as shown in interface 100, a highlight indicator 140 or other indicator can highlight the trace log message corresponding to the displayed image. As the video of further interaction by the interacting user continues its playback, the messages in trace log view 102 are scrolled appropriately to display and highlight the messages currently corresponding to displayed images.

These features allow a reviewing user to easily compare the visual context of the actions of the interacting user with the system-internal steps and events taking place for the subject program. If a crash occurs in the subject program, the visual context of the interacting user's actions are known from the video images and the system events are known from the trace logfile. In one example of a graphical editing program for circuit designs, this allows the reviewing user to debug and/or triage a crash to determine, for example, whether an interacting user was in the process of editing a schematic or a layout when the software crashed or exited, and if so, additionally determine with what types of design objects the interacting user was interacting (e.g., for schematics, these objects can be pins, wires or symbol instances, and for layouts they can be wires, vias, routing guides, etc.).

Figure 3:
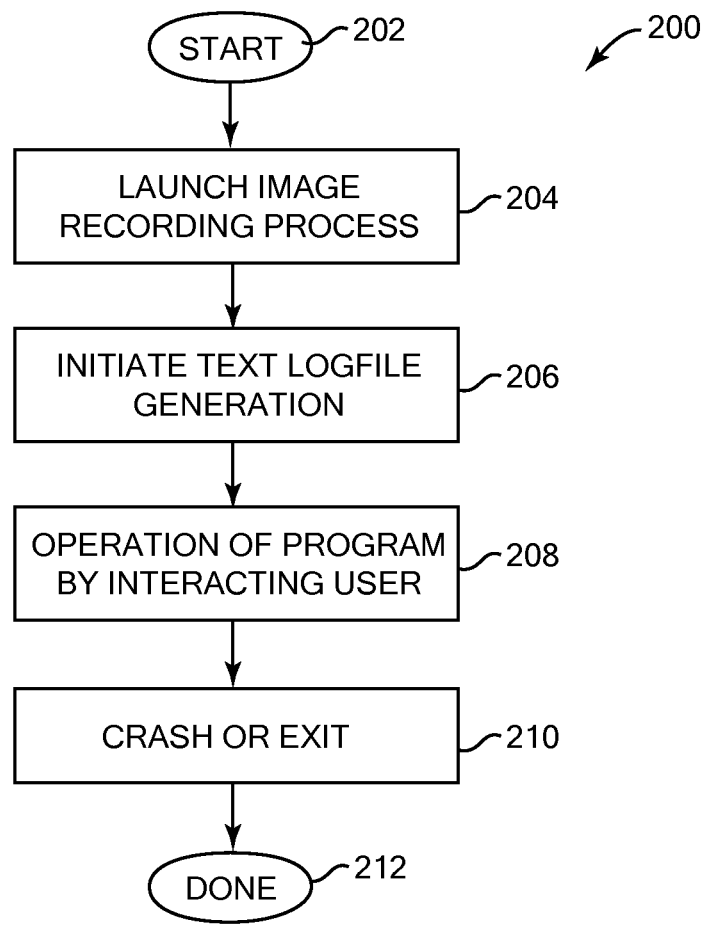
FIG. 3 is a flow diagram illustrating one example of a method for a program to provide log data according to some features described herein.

FIG. 3 is a flow diagram illustrating one example of a method 200 for a program to generate log data according to some features described herein. Method 200 and other methods described herein can be implemented, for example, by the components in system 10 or other system, including one or more CPUs or processors (or processing circuitry) and a display device 16. These methods can be implemented by software, program instructions or code, which can be stored on a computer readable medium. Alternatively, these methods can be implemented in hardware (logic gates, etc.), or in a combination of hardware and software. It should be noted that the steps described in the methods herein can be performed in a different order than shown and/or simultaneously (partially or completely) with other steps, where appropriate.

The method 200 begins at 202, and in step 204, an image recording process is launched. This process records image log data as a sequence of images of the visual output of the program and/or operating system experienced by the interacting user while the user operates the program, and captures as well the interactions of the user via a user-controlled cursor. In some embodiments, the image recording process can be launched by the subject program, such as application 26, with which the interacting user is interacting on a computer system such as system 10. For example, the image recording process can be a separate process or thread of control launched by the program. In some embodiments, this recording process can be automatically invoked and initiated when the subject program is initiated. This can be convenient for the interacting user, since a separate image recording program need not be independently invoked. In other embodiments the image recording process can be implemented by a separate program, e.g., running in the background on system 10 or a different connected system.

In step 206, the subject program initiates or provides trace logfile generation functionality that generates and stores trace log data based on execution of the subject program by the interacting user. For example, the subject program may include this trace logfile generation functionality within its code, or a separate program can be called or commanded to start and facilitate the trace logfile generation, e.g., by intercepting execution calls of the subject program and writing to the logfile.

In step 208, operation of the subject program by the interacting user is performed, e.g. the interacting user provides input and receives output in normal use of the program. For example, the interacting user can interact with a graphical interface of the subject program, move a cursor within the program's interface, input commands to the subject program, access various functions of the program, receive output from the subject program, etc. The image log data and trace log data is generated during this operation.

In step 210, the subject program terminates, from either an undesired termination such as crashing due to a bug or from some other undesired event or error, or from a normal and desired termination such as the interacting user selecting an exit command, a time duration expiring, etc. The process thus ends at 212.

Figure 4:
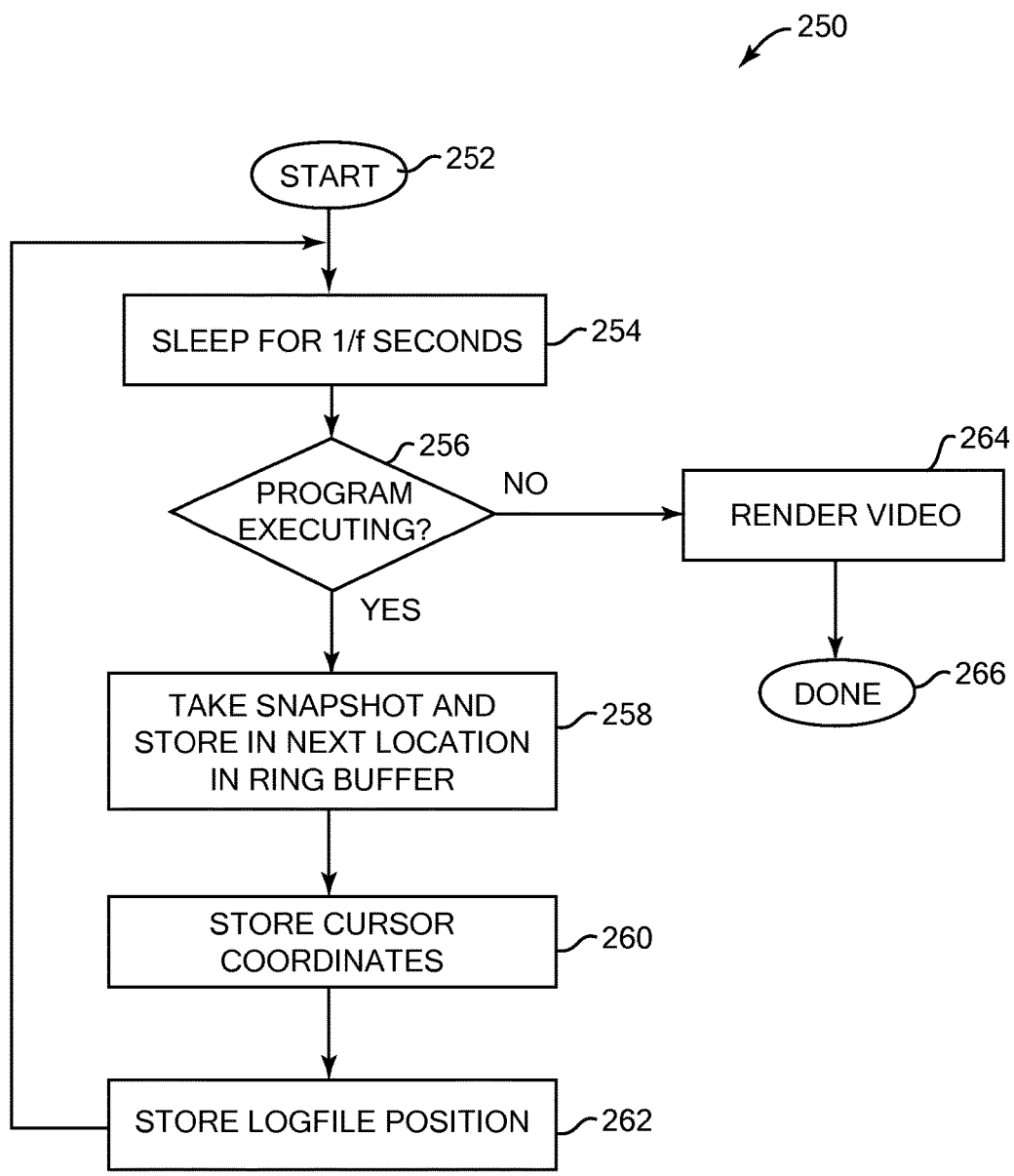
FIG. 4 is a flow diagram illustrating one example of a method for recording image log data including features described herein.

FIG. 4 is a flow diagram illustrating one example of a method 250 for recording image log data including features described herein. The method 250 can be implemented by the separate process or thread launched by the subject program in step 204 of FIG. 3, for example, and performed during operation of the subject program by the interacting user.

The method 250 begins at 252, and in step 254 the method goes to "sleep" for 1/f seconds, where f is the framerate of recording image log data in frames per second (fps). This allows the process to "wake up" f times per second to perform the check of step 256 at each wakeup. In step 256, the process checks whether the subject program is still executing, e.g., whether or not the subject program has terminated and additional image log data should still be recorded. In some embodiments, this check can be performed by sending a query to the operating system process table of the system 10 running the subject program and the method 250, to determine if an entry is present in the process table corresponding to the subject program. If the subject program is not executing, the process continues to step 264 to render video including captured images, as detailed below.

If the subject program is still executing, then in step 258 the process takes a snapshot image of the use of the program by the interacting user. For example, the snapshot can be of the user's desktop image on the display screen as the subject program is running, or the snapshot can be of a designated window or other defined area of the screen. In some embodiments, this snapshot can be captured and received using a query or command to a display server program running on the system 10 (e.g., X-server for a UNIX operating system) or to another display utility which performs the image capture and sends it to the method 250. In other embodiments, the snapshot-capture functionality can be included in the subject program or log generation block.

The captured image is stored on a storage device. In some embodiments, the image is stored in a ring buffer in the next available storage space. If the ring buffer is full, then the space storing the oldest captured image is overwritten with a newly-captured snapshot to maintain a predetermined maximum number of captured images in the buffer. In this way, only a subset of the captured images is stored in the ring buffer to conserve storage space. For example, the subset of images are the most recent snapshots, which can depict visual user interaction during a predetermined period of time occurring before a current point in time when the newly-captured image is stored. The most recent snapshots are likely to be the most pertinent images related to any subsequent termination of the program. The ring buffer scheme allows storage space to be efficiently used and re-used when recording images for indeterminate duration, as is often the case in described embodiments when generating image log data for program execution. Some embodiments can include a user-specified setting as to how many images are stored before the oldest images are overwritten, e.g., specified in seconds of execution, number of frames, etc.

In step 260, the process determines and stores the current location of a user-controlled cursor. For example, a standard query or command can be sent to an operating system process that provides coordinates of a mouse pointer or other user-controlled cursor indicating the position of the cursor in a referenced display area, such as a desktop or program window. In some embodiments, the cursor coordinates can be stored in a storage device (e.g., directory) with the associated snapshot taken in step 258, or with an identifier correlating it with the snapshot taken in step 258. Some embodiments can store the coordinates using a ring buffer scheme similarly as above, e.g., in the same ring buffer as the snapshot, or in a different (corresponding) ring buffer. In other embodiments, the coordinates are stored in a different storage device (e.g., memory 14) and a link between the stored cursor coordinates and the corresponding image snapshot can be stored. In some embodiments, a timestamp can be stored with the coordinates indicating the time at which they were sampled or stored.

In step 262, the process determines and stores the current position of the trace logfile that is concurrently storing message entries from program execution. This logfile position can be represented in different ways. For example, a current size of the logfile can be specified, indicating an offset (e.g., in bytes or other measure) from the beginning of the logfile and a position of the current end of the logfile, where this location corresponds to the interacting user's current activity. The position can be specified in other ways in other embodiments. In some embodiments, this logfile position can be obtained using a query to the operating system for such information. In some embodiments, the logfile position can be stored using a ring buffer scheme as described above, e.g., in a different ring buffer entry or the same ring buffer that stores the corresponding snapshot taken in step 258 and/or cursor coordinates stored in step 260.

In some embodiments, all three of these pieces of information (snapshot, cursor location, and logfile position) can be stored using a ring buffer scheme as described above. For example, this scheme can be implemented to store no more than F*D pieces of information, where F is the frame rate in frames per second, and D is the duration of the video (image sequence) to record before overwriting data in the buffer. In some embodiments, for example, storage of the snapshots can utilize disk storage due to the large amount of data to be stored, and storage of the cursor coordinates and logfile position can be stored in memory in a ring buffer. For example, during the storage of files including the snapshots, filenames of these files can be generated using modulo F*D arithmetic such that earlier filenames and snapshots are automatically overwritten on the storage device.

Referring back to step 256, if during a wakeup the process determines that the subject program is no longer executing (e.g., a corresponding entry in the process table is not found), then the image recording process is over and in step 264 a rendering of video (or other image sequence) log data from the snapshots is performed. This rendering is described in greater detail below with respect to FIG. 5. The process is then complete at 266.

Figure 5:
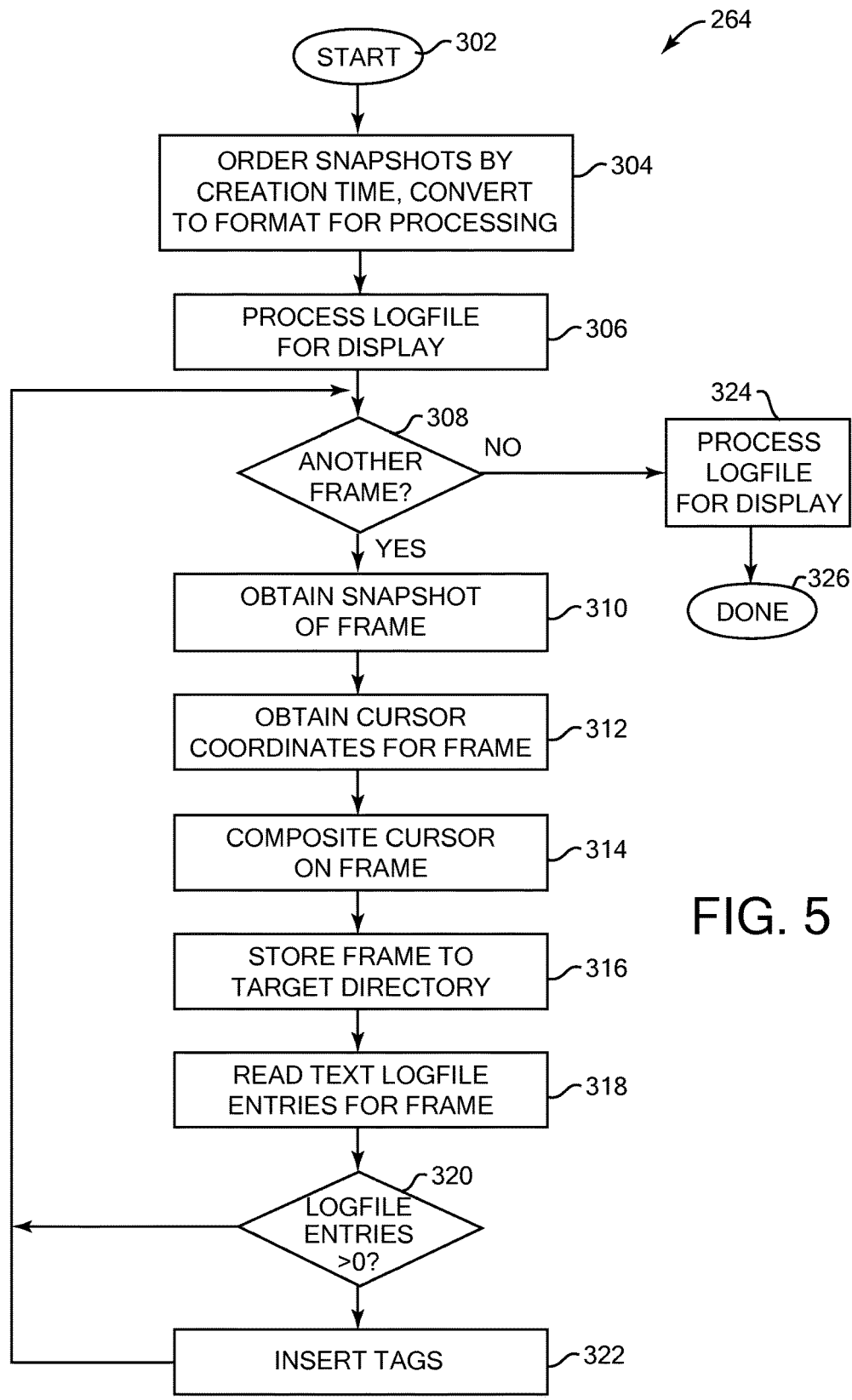
FIG. 5 is a flow diagram illustrating one example process of a step of FIG. 4 in which snapshot images are rendered into video log data.

FIG. 5 is a flow diagram illustrating one example process of step 264 of FIG. 4, in which snapshot images are rendered into video log data. This process occurs after program termination such that both image log data (e.g., snapshots) and trace log data generated during program execution up to program termination are available. The process begins at 302, and in step 304 the snapshot images are ordered by the time of their creation. For example, in the example from FIG. 4, F*D snapshots were created, where F is the frame rate in frames per second, and D is the duration of the video (which in some embodiments can be determined at least in part by the size of the ring buffer). The snapshots can also be converted to an appropriate format allowing image processing. For example, in some embodiments the snapshots can be converted to PNG files, JPG files, or other format. In step 306, the trace logfile is processed for display. This allows the logfile to be displayed in the desired format. For example, in some embodiments, the trace log data and image log data can be displayed by a standard web browser, which typically displays an HTML (Hypertext Markup Language) file. In some of these embodiments, the trace logfile can be processed by modifying the trace logfile (or creating a copy and modifying it) by adding a header section to the logfile, such as an HTML header (e.g., the first 11 lines in example Listing 2 below), allowing display of the logfile messages by the viewer block 30.

In step 308, the process checks if there is another frame of the image log data to process. If not, the process continues to step 324, described below. If there is another frame to process, then in step 310 one of the snapshots is obtained (such as the next snapshot in the order of step 304, or in a user-specified order) to form the basis of the video frame. In step 312 cursor coordinates are obtained corresponding to the obtained snapshot. For example, the coordinates can represent the location of a mouse pointer controlled by the interacting user at the time that the snapshot was recorded. These coordinates were stored in step 260 of FIG. 4. In some embodiments, the cursor coordinates are obtained from a storage entry corresponding to the obtained snapshot, or by matching an identifier associating them to the obtained snapshot (timestamp, number ID, etc.). In optional step 314, a cursor image is composited on the frame based on the obtained cursor coordinates. This step can be performed in embodiments in which an image of the cursor is not captured in the recorded snapshot image, so that an image of the cursor can be added to allow a reviewing user to have reference as to the actions the interacting user was taking at the time that the image log data was recorded. For example, a bitmap or other form of image of a cursor can be positioned at the retrieved coordinates within the snapshot image of the frame.

In step 316, the frame is written to a target directory that stores the video frames of the image log data. In step 318, trace logfile entries corresponding to the frame are read. These are one or more logfile messages that describe the execution of the subject program during or corresponding with the visual output depicted by the frame. For example, these entries can include logfile messages describing reception of coordinates of a mouse pointer when the interacting user pressed a mouse button, or reception of a command corresponding to a displayed button selected by the mouse pointer. To read the corresponding logfile entries, the logfile position corresponding to the current frame (e.g., stored in step 262 of FIG. 4) can be obtained from storage and the entries in the logfile can be read up to that position. For example, entries can be read from the last logfile position corresponding to the last frame displayed, to the logfile position of the frame currently displayed. In other embodiments, the corresponding logfile entries can be determined in other ways, such as by matching the obtained cursor coordinates of step 312 to cursor coordinates stored in the logfile, or by comparing timestamps or other links. In step 320, the process determines whether there are any trace logfile entries corresponding to the composite frame, e.g., whether the number of logfile entries retrieved in step 318 is greater than zero. For example, there may be no corresponding entries to the frame if no messages were written into the trace logfile after the last snapshot was taken. If there are no corresponding logfile entries, then the process returns to step 308 to check for another frame.

If there are corresponding logfile entries, then in step 322 tags are inserted in the modified trace logfile (e.g., marked-up version of logfile). The modified logfile is a version of the trace logfile that includes tags to allow highlighting and synchronization of entries of the logfile with display of the image log data. In some embodiments, one or more synchronization tags can be inserted in the modified logfile at the logfile position corresponding to the current frame (the logfile position was read from storage in step 318). The synchronization tags associate the position in the logfile with the frame, allowing, for example, the corresponding portion of the logfile to be scrolled into view of the interface 100 during the display of the corresponding frame of the image log data in video playback. For example, a synchronization tag can include a frame number that is the same as a frame number of the corresponding frame.

Highlighting tags can also be inserted in the modified logfile for the logfile portion or entry(ies), such as a message representing a user command interaction with the subject program. The highlighting tags cause the tagged log file entry to be highlighted or otherwise indicated during the display of the corresponding frame, such as with the highlight indicator 140 described above in the example of FIGS. 2A-2B. The process then returns to step 308 to check for another frame.

Referring to step 308, if it is determined that no additional frames are to be processed (e.g., there are no more recorded unprocessed image snapshots), then the method continues to step 324, in which the modified logfile is processed for display with any needed finalization modifications, such as additional tags for display in a web browser or other viewer (e.g., a closing </html> tag in an HTML file). The process is then complete at 326.

Example Listing 1 below provides an example line of a modified logfile which can include inserted tags to allow display of the trace log data in synchronization with image log data. This example is shown in HTML format, but other formats can be used in other embodiments.

Listing 1

```
<span id="frame24"> <a name="frame24"> </a>
\a_treeNavSelectionClear(dwindow('treeAssistant1))</span>
```

Example Listing 1 includes "<span>" tags used as highlighting tags for highlighting the text within these tags (between "<span>" and "</span>"). In this example, the term "_treeNavSelectionClear (dwindow('treeAssistant1))" represents a trace logfile entry, that entry corresponding to an interacting user's interaction with a particular component of a graphical editing application 26, such as providing a "clear" command for a selection. Thus this entry corresponding to a particular user interaction is highlighted. Example Listing 1 also includes anchor ("<a>") tags used as synchronization tags for causing the log entry to be scrolled into view during playback of the corresponding frame of the image log data. In this example, the "<span>" and "<a>" tags specify a frame number that is matched to a corresponding frame in the sequence of frames making up the video log data.

Example Listing 2, below, provides a longer example portion of a modified logfile.

Listing 2

```
<!DOCTYPE html PUBLIC "-//W3C//DTD XHTML 1.0
Transitional//EN" "http://www.w3.org/TR/xhtml1/DTD/xhtml1-
transitional.dtd">
<html xmlns="http://www.w3.org/1999/xhtml" xml:lang="en"><head>
<style type="text/css">
body .err { border: 1px solid #FF0000 } /* Error */
</style>
</head>
<body>
<html>
<body>
<pre>
\# Program start time UTC 2011.09.07 02:33:25.574
\# Local time Tuesday 6 September 2011, 7:33 pm
\o Program: @(#)$CDS: version XXX 09/05/2011 11:45 (sjfd1234) $
\o Hierarchy: /grid/cic/cm_t1b_002/main/lnx86/32/110905-
125/tools.lnx86/dfII/
\o Sub version: sub-version IC6.1.5.main.125 (32-bit addresses)
\# Host name (type): sjvnc07 (x86_64)
\# Operating system: Linux 2.6.9-89.0.19.ELsmp #1 SMP Wed Dec 30
12:52:55 EST
2009
\# X display name (WxH): :96.0 (1600x1100)
[.. snipped ..]
<span id="frame24"><a name="frame24"></a>\a
_treeNavSelectionClear(dwindow('treeAssistant1))</span>
<span id="frame29"><a name="frame29"></a>\r t</span>
\a _treeNavSelect(dwindow('treeAssistant1)   "/I12(schematic) Inst")
\r t
<span id="frame30"><a name="frame30"></a>\a
_treeNavSelectionClear(dwindow('treeAssistant1))</span>
\r t
\a _treeNavSelect(dwindow('treeAssistant1)   "/I18(schematic) Inst")
\r t
<span id="frame32"><a name="frame32"></a>\a
_treeNavSelectionClear(dwindow('treeAssistant1))</span>
\r t
\a _treeNavSelect(dwindow('treeAssistant1)   "/I32(schematic) Inst")
\r t
<span id="frame35"><a name="frame35"></a>\i exit</span>
<span id="frame42"><a name="frame42"></a>\o </span>
\o Loading cph.cxt
\# Memory report: on exit 113987584 (0x6cb5000) bytes, UTC
2011.09.07 02:34:39.866
```

-continued

Listing 2

```
\# Memory report: peak usage 113827840 (0x6c8e000) bytes
<span id="frame48"><a name="frame48"></a></pre>
</body>
</html>
```

In Listing 2, multiple user commands are tagged with the <span> and anchor tags. There are some gaps in the frame numbers, such as between "frame30" and "frame32" and between "frame32" and "frame35." These gaps correspond to ranges of frames obtained during a time in which no program execution or user interaction was active or recorded in the trace logfile. For example, the subject program may have been essentially idle during these periods.

Playback of Image and Text Log Data

Figure 6:
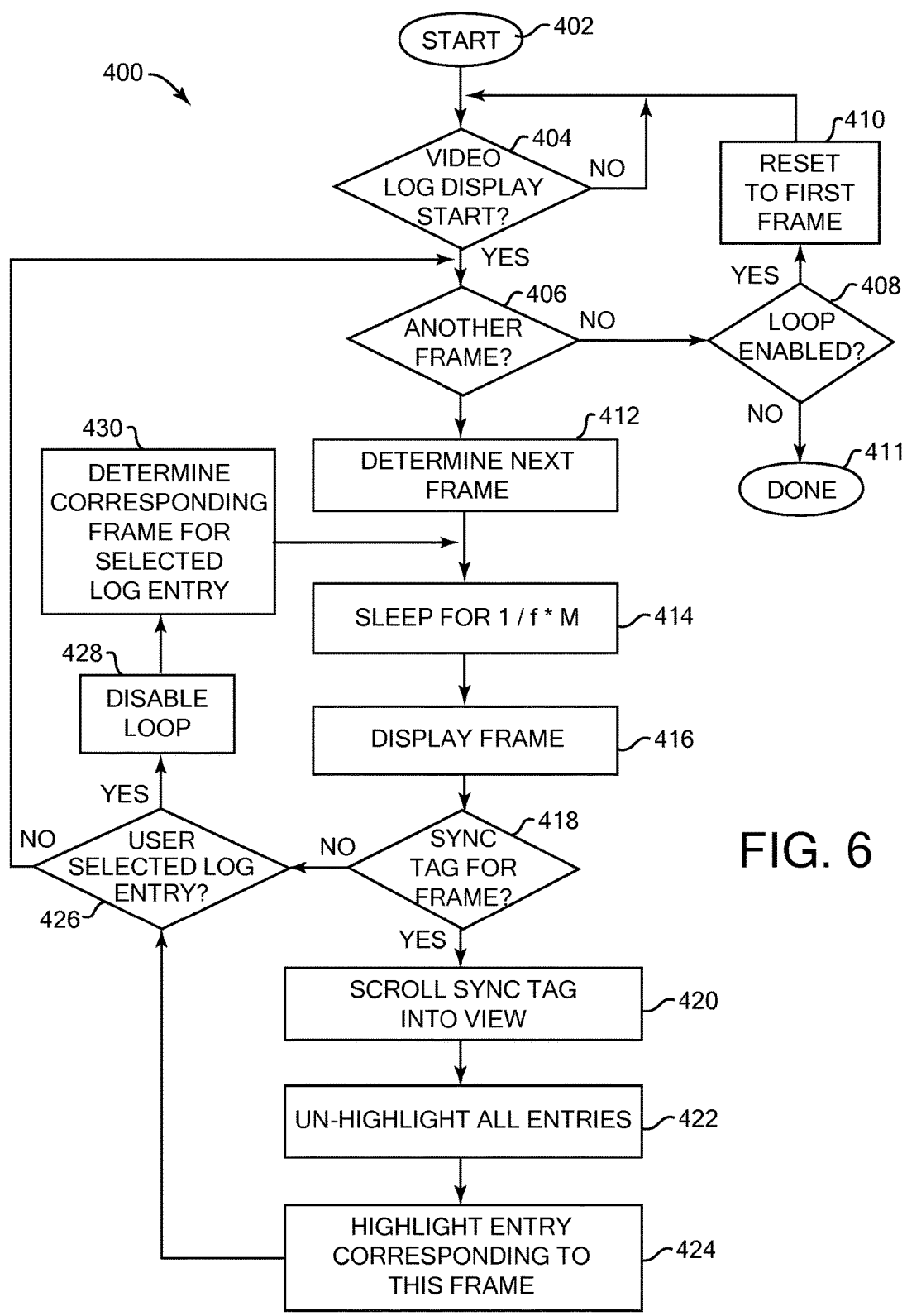
FIG. 6 is a flow diagram illustrating one example of a method for playing back a log of program execution including trace log data and image log data.

FIG. 6 is a flow diagram illustrating one example of a method 400 for playing back a log of program execution including trace log data and image log data. The method 400 can be implemented, for example, by viewer block 30 on a system 10 by a reviewing user who wishes to view the previously-generated/recorded log data. For example, in some embodiments providing a modified logfile in an HTML format, the viewer 30 can be a web browser or other application that can view HTML documents and display images and videos. Other embodiments can provide the log data in a different format that is viewable by a different type of viewer program.

Some embodiments can implement the display of log data in method 400 using a standard display format or language. For example, in some embodiments, video playback of the image log data can be implemented using JavaScript code to animate a sequence of the video frames and manipulate the display of trace logfile entries (e.g., provided in HTML) in order to synchronize the display of these two log data types. In some example embodiments, a playback block or program can be provided with a start frame number and an end frame number, and plays the video sequence between those frame numbers. In the example of FIGS. 2A-2B, the trace logfile message entries can be displayed in a view or frame of a web browser on one side, and the image log data frames and video can be displayed in a view on the other side.

The method 400 begins at 402, and in step 404 the process checks whether a video display of image log data has started. For example, the display can be a video animation of a sequence of the images of the subject application recorded during the interacting user's operation of the program. In some embodiments, the reviewing user can select a control, such as a start button 124 as shown in FIGS. 2A-2B, to begin the video log data playback. If the video log display has started, then in step 406 the process checks whether there is another frame in the video sequence of images to display. For example, if the display is at the end of the video sequence, there are no further images. In such a case, the process continues to step 408 to check if a looping function for the playback is enabled. If so, in step 410 the video playback is reset to start from the first frame at the beginning of the video sequence, e.g., starting at a point D seconds before the program terminated, and the process returns to step 404. If looping is not enabled, the process terminates at 411.

If there is another frame to display in step 406, then in step 412 the next frame is determined. In step 406 and 412, the next frame can be in any sequence or order, e.g., selected by the reviewing user. For example, the video images may have been selected to be played in reverse order (e.g., using controls displayed in an interface), such that the next frame to display is prior in time to the frame just displayed. In some embodiments, the reviewing user can select a frame (such as a frame number) displayed in the trace logfile being displayed in the interface 100 to provide random access to any frame such that the next frame to be displayed is determined by this selection. In next step 414, the process sleeps for a time period of 1/F*M, where F is the framerate in frames per second and M can be a user-specified slow-motion multiplier factor. For example, the default playback rate can be at the same framerate as in the recording of the snapshot images for the image log data, but this playback framerate can be delayed to view the log data more slowly by increasing M to a desired level and increasing the sleep time.

In step 416, the next frame is displayed. For example, the frame can be displayed in the image view 104 of the interface 100 as shown in the example of FIGS. 2A-2B. In step 418, the process checks whether there is a synchronization tag corresponding to the displayed frame in the modified logfile. As described above, synchronization tags (such as anchor tags) can be included in the modified logfile to mark a location in the logfile which corresponds to a particular image snapshot of the image log data. Step 418 can check whether the logfile has a synchronization tag (and/or highlighting tag) corresponding to the displayed frame. For example, in Listing 2, the frame number of the current frame can be matched to the frame number listed in a tag. If there is no synchronization tag corresponding to the current frame, the process continues to step 426, detailed below.

If there is a corresponding synchronization tag, then in step 420 the corresponding tag is scrolled into view in the display of the viewer program, such as in the trace log view 102 of interface 100 of FIGS. 2A-2B. The synchronization tag itself is not visible, but by displaying the tag, the message entry of the trace logfile associated with the tag is displayed by the viewer program. In step 422, all currently-highlighted entries of the trace logfile are un-highlighted, such as one or more entries of the logfile associated with a previously-displayed frame. In step 424, the entry of the trace logfile for the currently-displayed frame is highlighted. For example, this highlighting can be based on highlighting tags (e.g., span tags) as in the examples described above. These displaying and highlighting steps of the logfile entry corresponding to the displayed image has the effect of synchronizing the trace logfile display with the display of video frames.

In step 426, the process checks whether the reviewing user has selected one of the logfile entries of the trace log data. For example, the reviewing user can select an entry displayed by the viewer 30. Some implementations can provide additional JavaScript callbacks to allow the user to select a portion of text displayed in the interface. In some embodiments, the reviewing user can select an entry based on another method (search based on specified search criteria, a predetermined location in the logfile, etc.). If the reviewing user has selected a trace log entry, then in step 428 looping of the video playback is disabled (which is checked in step 408) and in step 430, the frame corresponding to the user-selected log entry is determined. For example, some embodiments can determine the stored frame that most closely corresponds to the selected position within the text logfile, based on the synchronization tag associated with the selected text (or the tag nearest to the selected text) that identifies or is associated with a frame. In some embodiments, for example, JavaScript callbacks can perform this determination. The process then returns to step 414 to sleep and display the determined frame. If the reviewing user has not selected a log entry in step 426, then the process returns to step 406 to check for another frame to display.

In some embodiments, only partial synchronization between the display of the trace logfile messages and image log data can be provided. For example, in some embodiments synchronization can be based on the recorded cursor coordinates of step 260 of FIG. 4 matching cursor coordinates stored in the trace logfile as part of program execution, where there may be periods of time in which no coordinates are stored in the trace logfile due to the user performing particular actions (e.g., minimizing a window, opening a file) which may not cause cursor coordinates to be stored in the logfile. Even at times when there is no display synchronization between the trace logfile and image playback, the image log data playback still can assist a reviewing user to see the context of user actions and help diagnose an error or crash in the program.

In some embodiments, a ring buffer can also be used for trace logfile entries. For example, only the last portion of the logfile that was generated before a crash or other program termination would be stored in the buffer.

In other embodiments, the above-described input from an interacting user to a subject program is not directly provided by a user, but is provided by another system or program, or is read from a storage device such as a disk or memory.

It should be noted that the order of steps shown in the methods described above are only examples. In other embodiments, a different order of steps can be used, or some steps can be performed simultaneously, depending on preference or implementation.

Although the present embodiments have been described in accordance with the examples shown, one of ordinary skill in the art will readily recognize that there could be variations to the embodiments and those variations would be within the spirit and scope of the present inventions. Accordingly, many modifications may be made by one of ordinary skill in the art without departing from the spirit and scope of the appended claims.

What is claimed is:

1. A method for viewing log data recorded during execution of a program, the method comprising:
   receiving, at a user interface of a computing system, one or more display characteristics;
   determining at least one awake time interval and at least one sleep time interval within a particular time period based at least in part upon the one or more display characteristics;
   performing, by at least a microprocessor of the computing system, the log display process in the at least one awake time interval, comprising:
      configuring to limit a buffer to store a constrained amount of recorded images based in part or in whole upon relevancy of the constrained amount of recorded images during at least the particular time period according to a buffer allocation scheme;
      causing a log display process to sleep in the at least one sleep time interval;
      causing a first display of the constrained amount of recorded images that depict prior user interaction with the program during the particular time period at least by retrieving the constrained amount of recorded images from the buffer;
      causing a second display of the constrained amount of logging information from a logfile that traces and describes at least one prior executions of the program during the particular time period;
      causing synchronization of the second display with the first display in the user interface using at least one synchronization tag that includes a frame number of a first frame of the constrained amount recorded images, wherein the logfile is configured to highlight some of the logging information that corresponds to the frame number during playback of the constrained amount of recorded images with at least one visual indicator; and
      compositing a visual element, which corresponds to the prior visual user interaction and is not captured in the constrained amount of recorded images, onto at least one video frame in the first display based in part or in whole upon the synchronization and the constrained amount of recorded images or the logging information.

2. The method of claim 1, wherein the prior visual user interaction includes movement of a user-controlled cursor.

3. The method of claim 1, wherein the logging information includes entries retrieved from a logfile produced by the program and displayed as text.

4. The method of claim 3, wherein the second display includes displaying the entries in a plurality of lines of text, and the synchronization of the second display of the logging information includes scrolling a plurality of lines of text to display a portion of the logging information corresponding to a currently-displayed recorded image.

5. The method of claim 3, wherein the logfile is modified to include tags that associate the entries in the logfile with one or more corresponding recorded images of the constrained amount of recorded images, and causing the synchronization includes matching a currently displayed image with a tag in the logfile.

6. The method of claim 3, further comprising receiving user input selecting some of the logging information displayed from the logfile, and causing a fourth display of at least one of the constrained amount of recorded images that corresponds to the user input.

7. The method of claim 1, wherein the synchronization of the second display of the logging information with the first display of the constrained amount of recorded images includes matching coordinates of a user-controlled cursor depicted by at least a portion of the constrained amount of recorded images with coordinates stored in the logging information.

8. The method of claim 1, wherein the synchronization of the second display of the logging information with the first display of the constrained amount of recorded images includes highlighting at least some of the logging information that corresponds to a currently-displayed one of the constrained amount of recorded images.

9. The method of claim 1, wherein the logging information traces and describes execution of the program including the program receiving one or more inputs from a user.

10. The method of claim 1, wherein the first display of the constrained amount of recorded images includes a third display of a sequence of the constrained amount of recorded images as video data.

11. A system for viewing log data recorded during execution of a program, the system comprising:
   at least one storage device storing recorded images depicting prior visual user interaction with the program during a particular time period;
   at least one microprocessor coupled to the at least one storage device: and non-transitory computer readable storage medium storing thereupon a sequence of instructions which, when executed by the at least one processor, causes the at least one microprocessor at least to;

receive, at a user interface of a computing system, one or more display characteristics;

determine at least one awake time interval and at least one sleep time interval within a particular time period based at least in part upon the one or more display characteristics;

perform, by the at least one microprocessor of the computing system, the log display process in the at least one awake time interval, where the at least one microprocessor configured to perform the log display process is further configured to:

limit a buffer to store a constrained amount of the recorded images based in part or in whole upon relevancy of the constrained amount of the recorded images during at least the particular time period according to a buffer allocation scheme;

cause a log display process to sleep in the at least one sleep time interval;

cause a first display of the constrained amount of the recorded images that depict prior user interaction with the program during the particular time period at least by retrieving the constrained amount of the constrained amount of the recorded images from the buffer;

cause a second display of a constrained amount of logging information from a logfile that traces and describes at least one prior execution of the program during the particular time period;

cause synchronization of the second display with the first display in the user interface using at least one synchronization tag that includes a frame number of a current frame of the first display of the constrained amount of the recorded images, wherein the logfile is configured to highlight some of the logging information that corresponds to the frame number during playback of the constrained amount of the recorded images with at least one visual indicator; and composite a visual element, which corresponds to the prior visual user interaction and is not captured in the constrained amount of the recorded images, onto at least one video frame in the first display based in part or in whole upon the synchronization and the constrained amount of the constrained amount of the recorded images or the logging information.

12. A computer program product comprising a non-transitory computer storage medium storing thereupon a sequence of instructions which, when executed by at least one processor of a computer system, causes the at least one processor to perform a set of acts for recording log data during execution of a program on a computer system, the set of acts comprising:

receiving, at a user interface of a computing system, one or more display characteristics;

determining at least one awake time interval and at least one sleep time interval within a particular time period based at least in part upon the one or more display characteristics;

performing, by at least a microprocessor of the computing system, the log display process in the at least one awake time interval, comprising:

configuring to limit a buffer to store a constrained amount of the recorded images based in part or in whole upon relevancy of the constrained amount of the recorded images during at least the particular time period according to a buffer allocation scheme;

causing a log display process to sleep in the at least one sleep time interval;

causing a first display of the constrained amount of the recorded images that depict prior user interaction with the program during the particular time period at least by retrieving the constrained amount of the recorded images from a buffer configured according to the buffer allocation scheme that limits the buffer to store a constrained amount of information based at least in part upon relevancy of the information during the particular time period;

causing a second display of a constrained amount of logging information from a logfile that traces and describes at least one prior executions of the program during the particular time period;

causing synchronization of the second display with the first display in the user interface using at least one synchronization tag that includes a frame number of a current frame of the first display of the constrained amount of the recorded images, wherein the logfile is configured to highlight some of the logging information that corresponds to the frame number during playback of the constrained amount of the recorded images with at least one visual indicator; and compositing a visual element, which corresponds to the prior visual user interaction and is not captured in the constrained amount of the recorded images, onto at least one video frame in the first display based in part or in whole upon the synchronization and the constrained amount of the constrained amount of the recorded images or the logging information.

13. The computer program product of claim 12, wherein the subset of the constrained amount of the recorded images depicts the prior visual user interaction during a predetermined time period occurring before a current point in time when a newly recorded image is stored.

14. The computer program product of claim 12, wherein capturing the constrained amount of the recorded images is halted upon a termination of the program such that the subset of the constrained amount of the recorded images depicts a last visual interaction with the program before the termination.

15. The computer program product of claim 12, the set of acts further comprising:

receiving a plurality of message entries in the logfile, the plurality of message entries tracing and describing the execution of the program; and modifying at least a portion of the plurality of message entries to associate the portion of the plurality of message entries with particular ones of the constrained amount of the recorded images.

16. The computer program product of claim 15, wherein modifying the at least a portion of the plurality of message entries includes providing tags in the logfile, the tags associating the at least a portion of the plurality of message entries with corresponding images of the constrained amount of the recorded images.

17. The computer program product of claim 16, the set of acts further comprising storing logfile positions associated with the constrained amount of the recorded images, each logfile position indicating a message entry of the plurality of message entries in the logfile that was generated at the time that a recorded image was captured.

18. The computer program product of claim 12, the set of acts further comprising storing coordinates for a recorded image of the constrained amount of the recorded images, the coordinates indicating one or more positions of a user-controlled cursor in a display area in at least the constrained amount of the recorded image.

* * * * *